(12) United States Patent
Avetisian et al.

(10) Patent No.: US 8,641,344 B1
(45) Date of Patent: Feb. 4, 2014

(54) PANEL FASTENER

(75) Inventors: Edward Avetisian, Burbank, CA (US);
Zeljko Balo, Sylmar, CA (US); Dan Welter, Thousand Oaks, CA (US);
Dennis Del Castillo, Alhambra, CA (US); Gerardo Limon, Sun Valley, CA (US)

(73) Assignee: Avibank Manufacturing, Inc., North Hollywood, CA (US)

( * ) Notice: Subject to any disclaimer, the term of this patent is extended or adjusted under 35 U.S.C. 154(b) by 271 days.

(21) Appl. No.: 13/110,514

(22) Filed: May 18, 2011

Related U.S. Application Data

(60) Provisional application No. 61/348,480, filed on May 26, 2010.

(51) Int. Cl.
*F16B 21/00* (2006.01)

(52) U.S. Cl.
USPC ............ 411/347; 411/321; 411/329; 411/348

(58) Field of Classification Search
USPC ........... 411/21, 22, 25, 59, 60.1, 60.3, 73, 74,
411/114, 115, 299, 305, 306, 315, 316, 317,
411/319, 321, 325, 328, 329, 331, 347, 348,
411/352, 358, 359, 552, 999
See application file for complete search history.

(56) References Cited

U.S. PATENT DOCUMENTS

| | | | | |
|---|---|---|---|---|
| 530,083 A * | 12/1894 | Bradley | ........................ | 411/552 |
| 608,174 A * | 8/1898 | Byrnes | ........................ | 285/210 |
| 757,838 A * | 4/1904 | Pfleghar | ........................ | 24/627 |
| 994,726 A * | 6/1911 | Dorman | ........................ | 411/352 |
| 1,587,397 A * | 6/1926 | Menard | ........................ | 411/209 |
| 2,405,400 A * | 8/1946 | Butterfield | ........................ | 411/348 |
| 3,055,015 A * | 9/1962 | Silverman | ........................ | 4/240 |
| 3,079,829 A * | 3/1963 | Chester | ........................ | 411/347 |
| 3,645,160 A * | 2/1972 | Artioli et al. | ........................ | 411/347 |
| 4,119,131 A * | 10/1978 | Cosenza | ........................ | 411/352 |
| 4,764,065 A * | 8/1988 | Johnson | ........................ | 411/21 |

* cited by examiner

*Primary Examiner* — Roberta Delisle
(74) *Attorney, Agent, or Firm* — James M. Duncan, Esq.; Klein DeNatale Goldner

(57) ABSTRACT

A fastener has an integral retention mechanism, which is affixed to the fastener without the need for EDM slots along the length of the fastener. The integral retention mechanism reliably secures the fastener to a panel until it is desired to remove the fastener, in which case the fastener may be easily disengaged without any additional tools. The fastener has an axial aperture having an opening in the tip of the fastener, and axially aligned openings along opposing sides of the fastener which penetrate through to the axial aperture. A u-shaped spring mechanism is disposed within the axial aperture, with a portion of each leg outwardly extendable through the axially aligned openings to provide a retention mechanism.

12 Claims, 7 Drawing Sheets

PANEL FASTENER

CROSS-REFERENCE TO RELATED APPLICATIONS

U.S. Provisional Application No. 61/348,480 for this invention was filed on May 26, 2010, for which application these inventors claim domestic priority.

BACKGROUND OF THE INVENTION

The disclosed device relates generally to anchoring devices and fasteners which are utilized to attach adjacent panel members or to attach structures to panel members. It is to be understood that the term "workpiece" as used in this specification refers to any material for which it is desirable to use any of the disclosed embodiments of this device. Typically, but not necessarily, the materials for which such devices have the greatest utility are for thin walled materials such as sheet metal or laminated composite materials, such as carbon fiber and plastic panels, where the matrix material is not conducive for threading or retaining threaded inserts.

It is desirable in some applications, such as utilization with aircraft panels, that the fasteners remain attached to the panel, even after the threads are backed out of the female threads of the structure on the other side of the panel, where the structure may be a nut or other structure having female threads for receiving the fastener. It is known to use various means for retaining the fastener to the panel, such as grommets or clips, such as that shown in FIG. 1. This type of fastener utilizes prongs on the washer which provides proper orientation during installation and removal, and helps to eliminate wear and elongation of the fastener holes in the metallic or composite panels. With the type of device 100 shown in FIG. 1, slots 12 are manufactured along the long axis of the fastener by electrical discharge manufacturing (EDM).

The type of apparatus shown in FIG. 1, and the other prior art devices have some disadvantages. Installing grommets or clips can require additional tooling, and can be time consuming. The most common method, using grommets, requires that the fastener have EDM slots on the side of the fastener, including the portion of the fastener which is preloaded by making the fastener up into female threads. Thus, the EDM slots cause a reduced load-bearing diameter, thus reducing the allowable tensile and shear loads for the fasteners.

SUMMARY OF THE INVENTION

The disclosed apparatus is a fastener with an integral retention mechanism, which is affixed to the fastener without the need for EDM slots along the length of the fastener. The integral retention mechanism reliably secures the fastener to the panel until it is desired to remove the fastener, in which case the fastener may be easily disengaged without any additional tools.

The fastener comprises, in relative order from the head end to the tip at the opposite end, a head, an unthreaded section of shank, and a threaded section of shank which extends to the tip. The fastener further comprises an aperture axially extending from an opening in the tip through a portion of the bolt shank to a termination within the threaded section of the shank. The threaded section of the shank further comprises axially oriented openings on opposite facing sides of the shank, where the openings penetrate to the internal aperture. The openings may begin at approximately the first full thread from the tip, and may extend axially approximately four to six full threads.

The fastener further comprises a u-shaped spring member, comprising a biasing section comprising the bottom closed portion of the "U", where the biasing section may be of constant thickness and relatively thin with respect to the upper portions of each leg. It is to be appreciated that the terms "upper" and "lower" with respect to the u-shaped spring member are used according to the letter "U" as normally oriented. Thus, the term "lower" refers to the closed bottom portion and the term "upper" refers to the opened top portion. A long axis is defined by the shank of the fastener.

Each leg transitions into a shoulder section, having a lower shoulder section which is approximately perpendicular to the long axis of the fastener, and an upper shoulder section, where the upper shoulder section forms an angle of approximately 45 degrees with the long axis of the fastener. The shoulder section of each leg may be substantially thicker than the biasing section. The upper portion of each leg of the u-shaped spring member a reinforced catch section having an outwardly facing flat surface which transitions into an outwardly facing pawl at the end of each upper leg member.

The u-shaped spring member is disposed, closed portion first, into the aperture of the fastener, such that the upper portion of each leg of the spring member, specifically the shoulder sections, the catch sections, and the outwardly facing pawls extend through the openings on each side of the fastener, while the closed portion remains within the interior of the aperture, adjacent to the termination of the aperture.

DETAILED DESCRIPTION OF THE EMBODIMENTS

Figure 1:
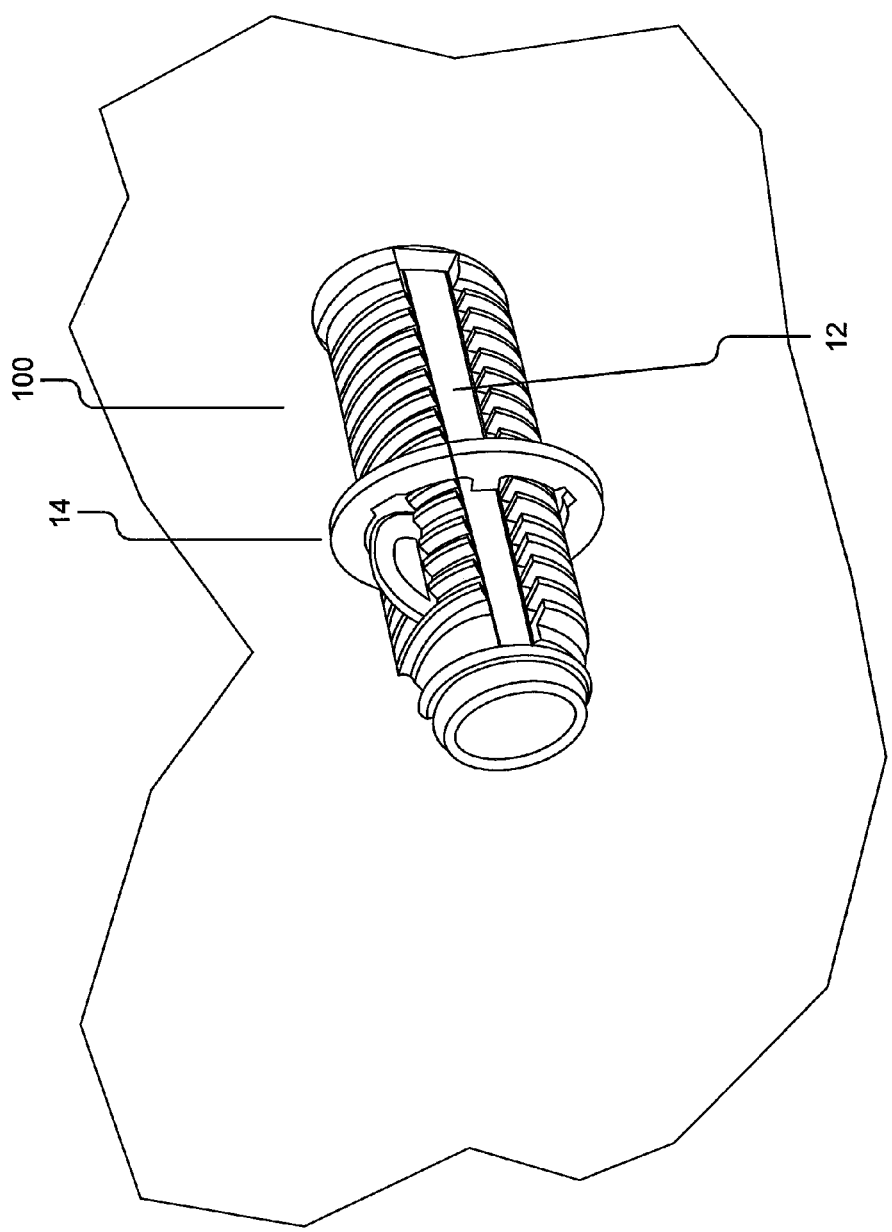
FIG. 1 shows an embodiment of a prior art panel fastener.
Figure 2:
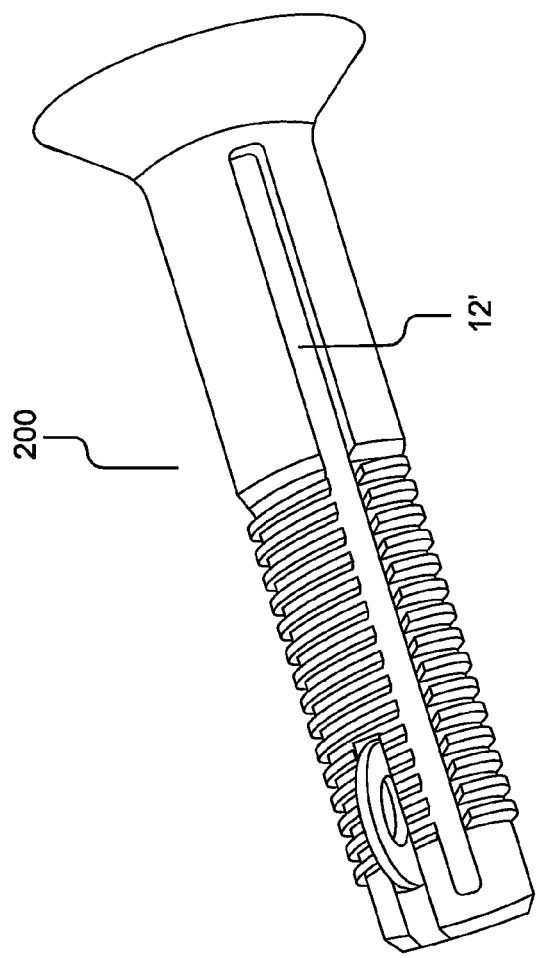
FIG. 2 shows another embodiment of a prior art panel fastener.

Referring now to the Figures, an embodiment of a prior art panel fastener 100 is shown in FIG. 1, showing the fastener extending through a panel, showing the EMD slots 12 and the washer 14. FIG. 2 shows another embodiment of a prior art fastener 200 showing how the EDM slots 12' extend along nearly the entire length of the fastener.

Figure 3:
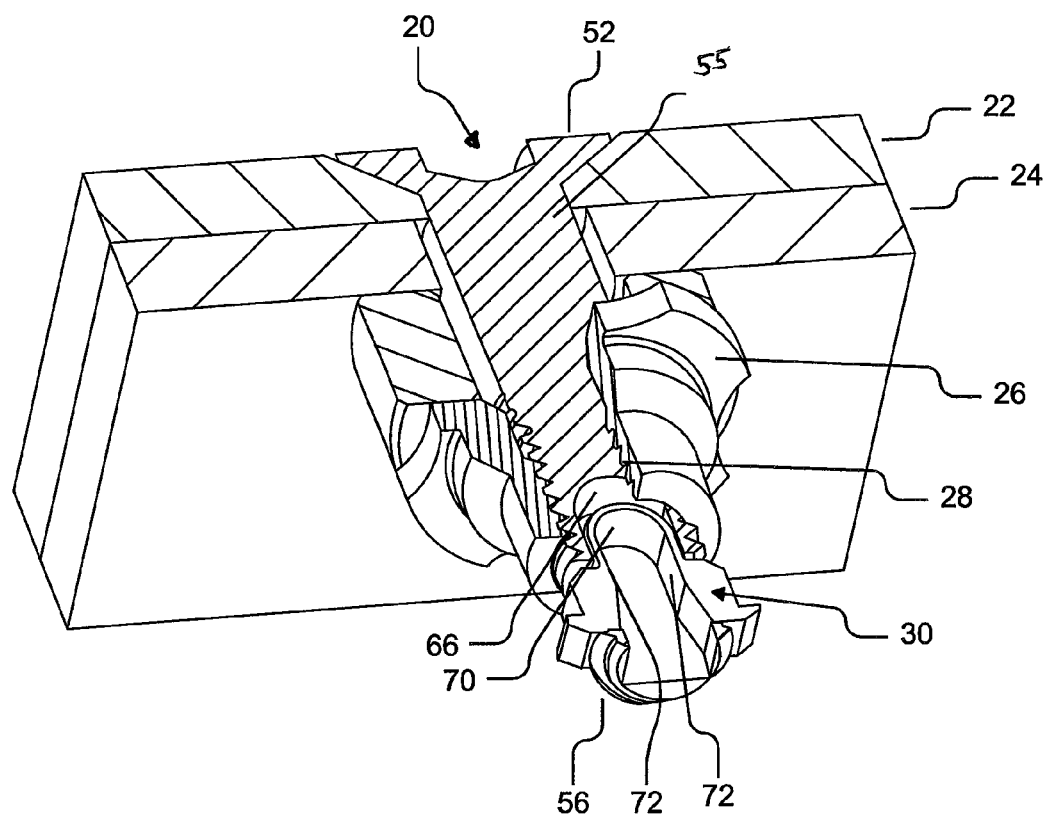
FIG. 3 shows a sectioned perspective view of an embodiment of the presently disclosed invention.

FIG. 3 shows an embodiment of the presently disclosed panel fastener 20 extending through two panels, 22, 24 to be connected. This figure shows the panel fastener 20 made up into a nut 26 having female threads to which the male threads of the panel fastener may be inserted. As shown in the Figures, fastener 20 has a head member 52 and a shank 54 depending from the head member. The head member 52 may comprise tool engagement means such as a broached hex opening 42 or other known means. The shank 54 has a first end 55 attached to the head member and a second end 56 which is opposite the head member. The shank 54 has an unthreaded section 58 extending from the first end 55 to an axial position along the shank where a threaded section 60 begins. The threaded section 60 extends to the second end 56. The second end 56 has a tip 62, which has an axial aperture 36 which extends from an opening in the tip to a termination 66 within the threaded section 60 of the shank 54. Axially aligned openings 38 are machined in the threaded section 60, where the openings are on opposite facing sides of the shank 54. The axially aligned openings 38 penetrate through to the axial aperture 36. The axially aligned openings 38 may begin at approximately the first full thread from the tip 62 and extend axially toward the head member 52 four to six full threads.

Contained within the axial aperture 36 is a spring member 30. Spring member 30 has a closed end 70 and two legs 72 depending from the closed end. Spring member 30 is so disposed within the axial aperture 36 such that the closed end 70 is adjacent to the termination 66 and, once the legs 72 are not compressed by a nut 26, a portion of each leg 72 extends outwardly through the axially aligned opening 38 which is adjacent to that particular leg 72.

Figure 4:
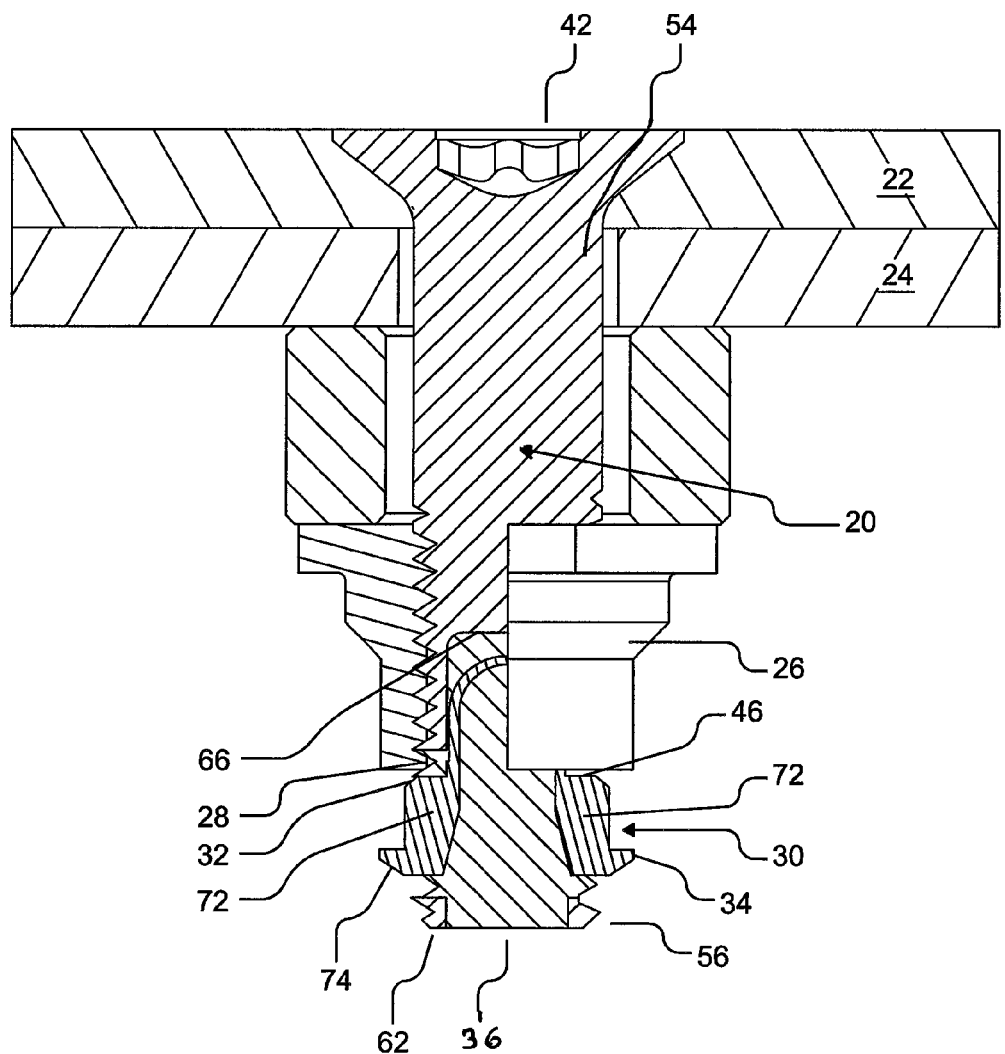
FIG. 4 shows a side sectional view of the embodiment shown in FIG. 3, showing a nut member in place.

FIG. 4 shows the a side sectional view of the embodiment shown in FIG. 3, showing how, once the threads 28 of nut 26 are made up sufficiently on the threaded section 60 of the fastener 20, the spring member 30 opens up, extending a portion of each leg 72 through the axially aligned openings 38 in the sides of fastener 20

Figure 5:
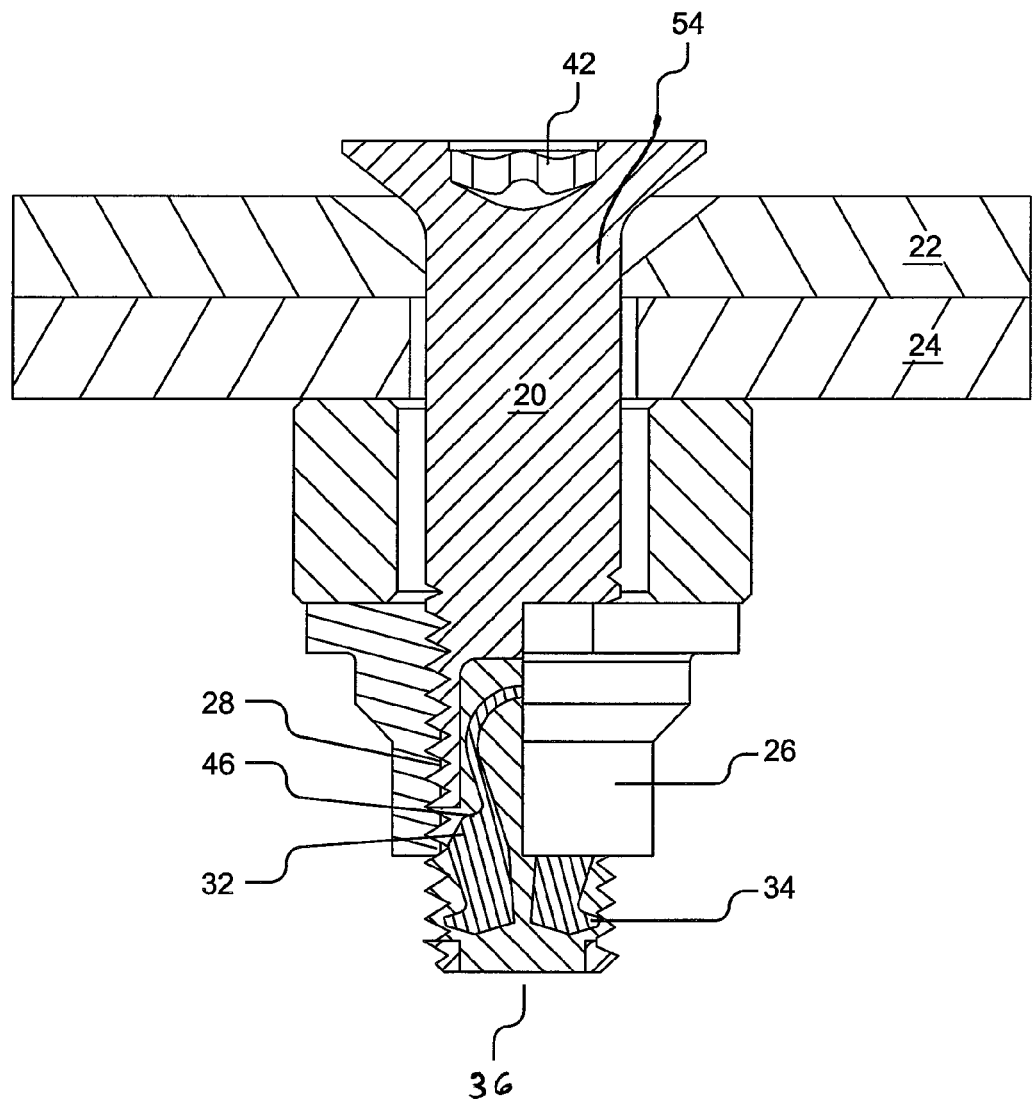
FIG. 5 shows a side sectional view of the embodiment shown in FIG. 3, showing how the locking pawls retract to allow the removal of a nut member.

FIG. 5 shows a side sectional view of the embodiment shown in FIG. 4, showing how rotation of fastener 20 causes spring member 30 to begin to collapse as shoulder section 32 engages the threads 28 of nut 26. The collapse of spring member 30 causes sufficient inward movement of the legs 72 and pawl 34 to allow the removal of nut 26 without damage to the threads 28 of the nut. It is to be further noted that the pawl 34 may have an angled bottom 74 which, upon insertion of the fastener 20 into either an aperture in panels 22, 24 or into nut 26, causes the spring member 30 to collapse inwardly, allowing the insertion of the fastener into either panels or nuts.

As noted above, the terms "upper" and "lower," when used with respect to the u-shaped spring member, are used according to the letter "U" as normally oriented and not as depicted in the figures. Thus, the term "lower" refers to the closed bottom portion and the term "upper" refers to the opened top portion. With these definitions in mind, each leg member 72 of spring member 30 transitions into a shoulder section 32 having a lower shoulder section 46 which, when the spring member is in an uncompressed position, is approximately perpendicular to the long axis of the fastener 20. Each leg member 72 further comprises an upper shoulder section 48, where the upper shoulder section forms an angle of approximately 45 degrees with the long axis when the spring member is in an uncompressed position. The shoulder section 32 of each leg 72 will typically be substantially thicker than the biasing section 76. The upper portion of each leg of the u-shaped spring member comprises a reinforced catch section 50 having an outwardly facing flat surface which transitions into an outwardly facing pawl 34 at the end of each upper leg member.

Figure 6:
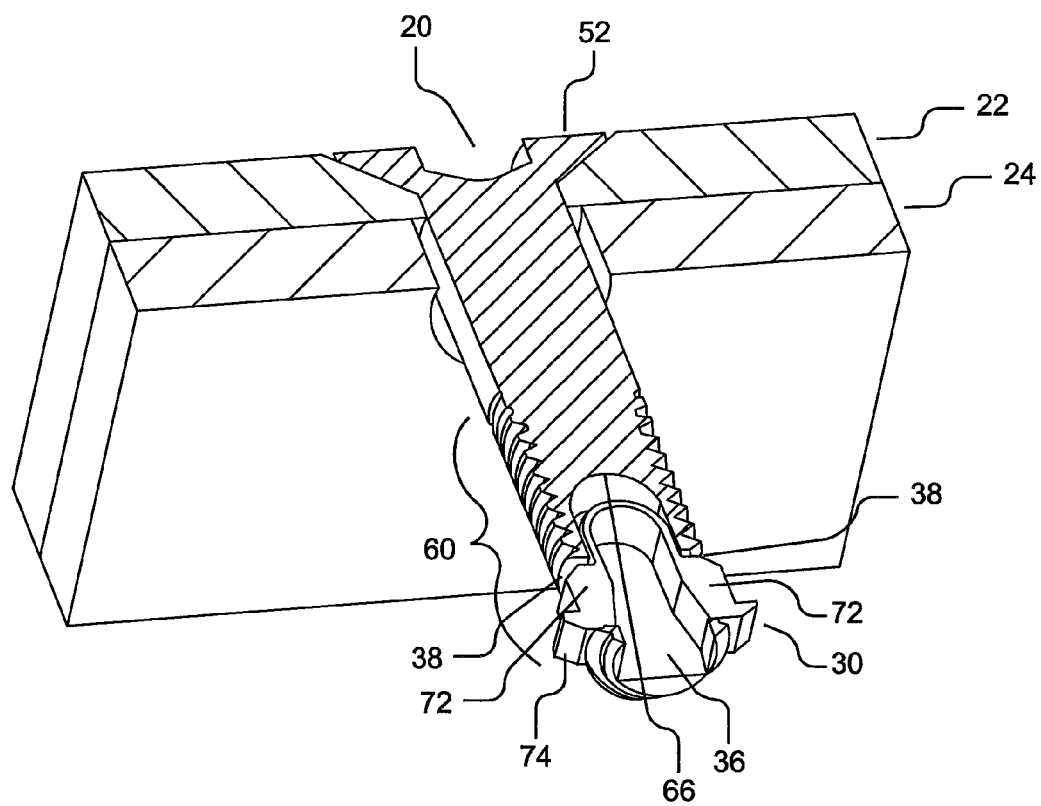
FIG. 6 shows a sectional view of a fastener of the present invention inserted within adjacent panels.

FIG. 6 shows a sectional view of a fastener 20 of the present invention inserted within adjacent panels 22, 24. This figure shows how spring member 30 is disposed within axial aperture 36 of the fastener, and how the pawls 34 and lower portions of spring member 30 protrude through axially aligned openings 38 in the sides of the fastener.

A comparison of FIGS. 4 and 5 shows the fastener 20 in operation. In FIG. 4, spring 30 is in an uncompressed position. In the uncompressed position, each lower shoulder section 46 member is approximately perpendicular to the long axis of the fastener 20. However, in the compressed position, as shown in FIG. 5, the shoulder section member is not perpendicular to the long axis of the fastener.

Figure 7:
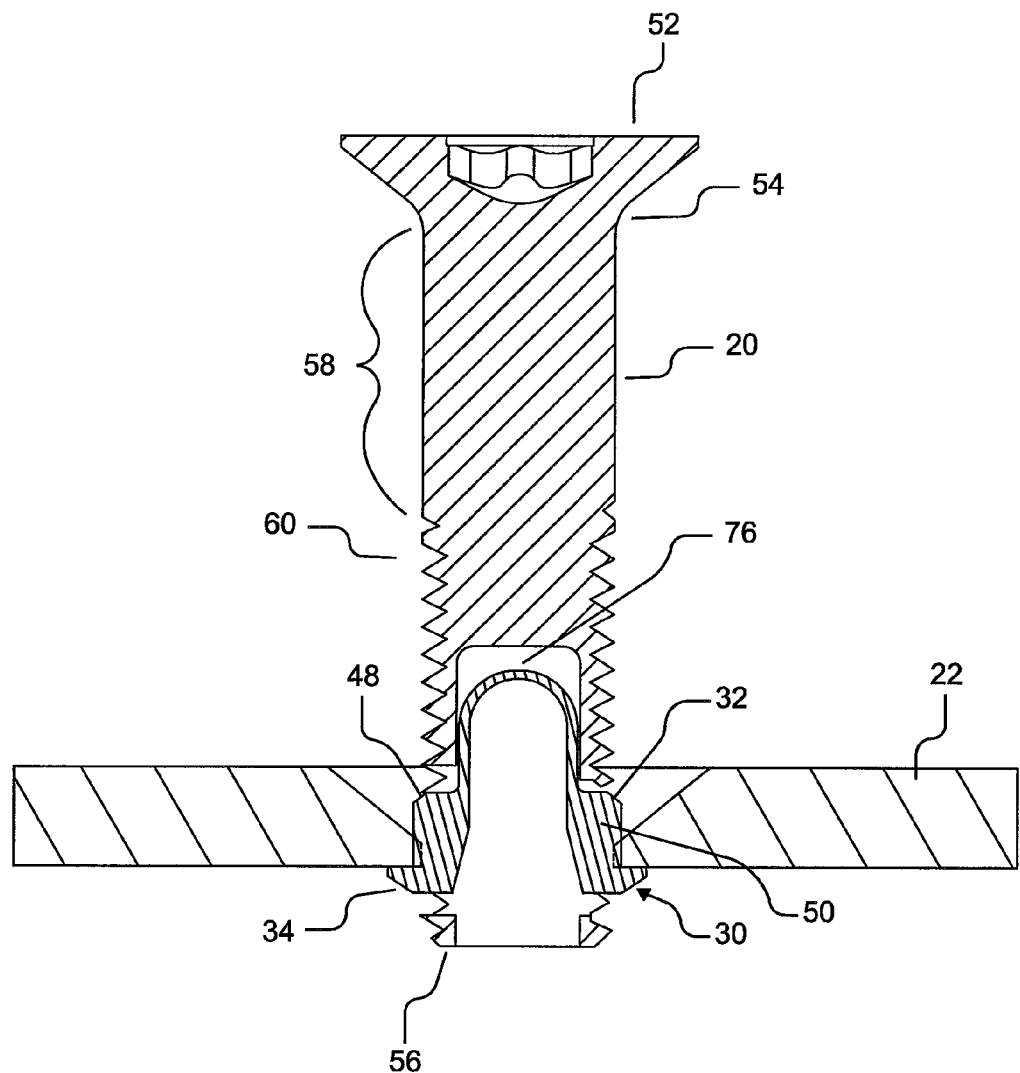
FIG. 7 shows a sectional view of a fastener within a panel, showing how the spring member prevents the withdrawal of fastener from the aperture in the panel.

FIG. 7 shows a sectional view of a fastener 20 within a panel 22, showing how spring member 30 prevents the withdrawal of fastener 20 from the aperture in the panel.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following appended claims.

What is claimed is:

1. A panel fastener comprising:
   a head member;
   a shank depending from said head member, the shank comprising a first end attached to the head member and a second end opposite the head member, an unthreaded section extending from the first end to an axial position along the shank where a threaded section begins, the threaded section extending to the second end;
   the second end comprising a tip, the tip comprising an axial aperture extending from an opening in the tip to a termination within the shank adjacent to the threaded section;
   the threaded section further comprising axially aligned openings on opposite facing sides of the shank, the openings penetrating through to the axial aperture; and
   a spring member comprising a closed end and two legs depending from the closed end, each leg commencing with an outwardly facing shoulder and terminating with an outwardly extending pawl, each pawl comprising a bottom facing said tip, a first portion of said bottom being perpendicular to the axis defined between the first end and the second end, and a second portion of said bottom being angled to allow insertion of said fastener into an aperture; wherein the spring member is disposed within the axial aperture with the closed end adjacent to the termination and a portion of each leg extendable into the respective axially aligned opening adjacent to each leg.

2. The panel fastener of claim 1 wherein where each leg comprises an end having an outwardly facing pawl which is extendable into the respective axially aligned opening.

3. The panel fastener of claim 2 wherein the bottom side of each pawl comprises a tapered edge.

4. The panel fastener of claim 1 wherein the head member comprises tool engagement means.

5. The panel fastener of claim 1 wherein the openings begin at approximately the first full thread from the tip, and extend axially toward the head four to six full threads.

6. The panel fastener of claim 1 wherein the closed-end comprises a biasing section, the biasing section of constant thickness.

7. The panel fastener of claim 6 wherein the thickness of each of the legs is greater than the thickness of the biasing section.

8. A panel fastener comprising:
   a head member;
   a shank depending from said head member, the shank comprising a first end attached to the head member and a second end opposite the head member, wherein an axis is defined between the first end and the second end, an unthreaded section extending from the first end to an axial position along the shank where a threaded section begins, the threaded section extending to the second end;

the second end comprising a tip, the tip comprising an axial aperture extending from an opening in the tip to a termination within the shank adjacent to the threaded section;

the threaded section further comprising axially aligned openings on opposite facing sides of the shank, the axially aligned openings penetrating through to the axial aperture; and a spring member comprising a closed end and two legs depending from the closed end, wherein each leg comprises a shoulder member and an outwardly extending pawl, each pawl comprising a bottom facing said tip, a first portion of the said bottom being perpendicular to the axis defined between the first end and the second end, and a second portion of said bottom being angled, wherein the spring member is disposed within the axial aperture with the closed end adjacent to the termination and each leg partially extends into the respective axially aligned opening adjacent to the leg, wherein the spring member has a compressed position and an uncompressed position wherein, in the uncompressed position, each shoulder member is approximately perpendicular to the axis.

9. The panel fastener of claim 8 wherein the head member comprises tool engagement means.

10. The panel fastener of claim 8 wherein the openings begin at approximately the first full thread from the tip, and extend axially toward the head four to six full threads.

11. The panel fastener of claim 8 wherein the closed-end comprises a biasing section, the biasing section of constant thickness.

12. The panel fastener of claim 11 wherein the thickness of each of the legs is greater than the thickness of the biasing section.

* * * * *